(12) United States Patent
Frayer et al.

(10) Patent No.: US 12,378,688 B2
(45) Date of Patent: Aug. 5, 2025

(54) SELECTIVE CHROME PLATING WITH FLUSH INTERFACE

(71) Applicants: SRG Global Liria, S.L., Liria (ES); SRG Global, LLC, Troy, MI (US)

(72) Inventors: Robert W. Frayer, Troy, MI (US); Sergio Piles Guillem, Liria (ES); Juan Monleon, Liria (ES)

(73) Assignees: SRG Global Liria, S.L., Liria (ES); SRG Global, LLC, Troy, MI (US)

( * ) Notice: Subject to any disclaimer, the term of this patent is extended or adjusted under 35 U.S.C. 154(b) by 146 days.

(21) Appl. No.: 17/416,563

(22) PCT Filed: Dec. 20, 2019

(86) PCT No.: PCT/EP2019/086779
§ 371 (c)(1),
(2) Date: Jun. 21, 2021

(87) PCT Pub. No.: WO2020/128032
PCT Pub. Date: Jun. 25, 2020

(65) Prior Publication Data
US 2022/0056607 A1    Feb. 24, 2022

(30) Foreign Application Priority Data

Dec. 21, 2018    (ES) ................ ES201831275

(51) Int. Cl.
*C25D 5/56*    (2006.01)
*B29C 45/00*    (2006.01)
(Continued)

(52) U.S. Cl.
CPC ........... *C25D 5/56* (2013.01); *B29C 45/0053* (2013.01); *B29C 45/16* (2013.01); *C25D 5/02* (2013.01);
(Continued)

(58) Field of Classification Search
None
See application file for complete search history.

(56) References Cited

U.S. PATENT DOCUMENTS

| 5,935,691 A | 8/1999 | Tsai |
| 2002/0135519 A1 | 9/2002 | Luch |

(Continued)

FOREIGN PATENT DOCUMENTS

| CN | 106149024 A | 11/2016 |
| CN | 108166023 A | 6/2018 |

(Continued)

OTHER PUBLICATIONS

Gutgar, DE 102016003173 A1, machine translation (Year: 2017).*

(Continued)

*Primary Examiner* — Wojciech Haske
(74) *Attorney, Agent, or Firm* — Alston & Bird LLP

(57) ABSTRACT

A selectively chrome plated object having a substantially flush interface comprises a first portion formed by injection molding a plateable resin and defining a first top surface, a second portion formed by injection molding a non-plateable resin and defining a second top surface, the second portion sitting proud of the first portion such that the second top surface of the second portion is offset from the first top surface of the first portion, and a third portion formed by a chrome plating process where a chrome plating is applied to the first top surface of the first portion such that a third top surface of the third portion is substantially flush with the second top surface of the second portion.

20 Claims, 3 Drawing Sheets

(51) Int. Cl.
*B29C 45/16* (2006.01)
*C25D 5/02* (2006.01)
*B29K 55/02* (2006.01)
*B29K 69/00* (2006.01)
*C25D 5/40* (2006.01)

(52) U.S. Cl.
CPC .. *B29C 2045/0079* (2013.01); *B29K 2055/02* (2013.01); *B29K 2069/00* (2013.01); *B29K 2995/0072* (2013.01); *B29K 2995/0097* (2013.01); *C25D 5/40* (2013.01)

(56) References Cited

U.S. PATENT DOCUMENTS

2012/0091623 A1* 4/2012 Wippler .................. B29C 45/16
264/232
2017/0341609 A1* 11/2017 Frayer .................. B29C 45/0053

FOREIGN PATENT DOCUMENTS

| DE | 102016003173 A1 | * | 9/2017 | |
|---|---|---|---|---|
| EP | 3299139 A1 | | 3/2018 | |
| GB | 2349598 A | * | 11/2000 | ......... B29C 45/1615 |
| TW | 200944694 A | * | 11/2009 | |

OTHER PUBLICATIONS

Machine translation of Chen et al. TW 200944694 A, (Year: 2009).*
PCT International Search Report and Written Opinion dated Mar. 30, 2020 for International Application No. PCT/EP2019/086779. 9 pages.

* cited by examiner

SELECTIVE CHROME PLATING WITH FLUSH INTERFACE

CROSS-REFERENCE TO RELATED APPLICATIONS

This application is a 371 U.S. National Stage of International Application No. PCT/EP2019/086779, filed Dec. 20, 2019, which claims the benefit of Spanish Patent Application No. P201831275, filed on Dec. 21, 2018. The disclosures of each of the above applications are incorporated herein by reference in their entirety.

FIELD

The present application generally relates to chrome plating and, more particularly, to selectively chrome plated objects with flush interfaces and their methods of manufacture.

BACKGROUND

Selective chrome plating generally involves forming an object that comprises at least plateable and non-plateable resins formed by a multi-shot injection molding process (e.g., two or more shots). When forming the object by injection molding, a flush interface is typically formed between the plateable and non-plateable resins. A chrome plating process is then performed, which causes a layer of chrome plating to be applied to a top surface of the plateable resin portion. This results in a non-flush interface between a top surface of the chrome plating and a top surface of the non-plateable resin portion. FIG. 1 illustrates a side or cross-sectional view of a selectively chrome plated object 100 having a non-flush interface 104 where a chrome plating portion 108 deposited on a top surface 112 of a plateable resin portion 116 creeps or overplates over a top surface 120 of a non-plateable resin portion 124.

This non-flush interface 104 could be visible and/or could be felt by touch. The chrome creep or overplating affects the perceived thickness of the non-plateable resin portion 124, thereby impacting the initial design intent of the component. Multi-shot injection molded components are sometimes manufactured for use as backlighted decorative trims. Some of these components are also further processed to exhibit a partial chrome looking surface by means of galvanic electroplating. This chrome creep could also negatively affect the appearance of the backlighting. Accordingly, while such selectively chrome plated objects and their methods of manufacture work for their intended purpose, there remains a need for improvement in the relevant art.

SUMMARY

According to one aspect of the present disclosure, a selectively chrome plated object having a substantially flush interface is presented. In one exemplary implementation, the object comprises a first portion formed by injection molding a plateable resin and defining a first top surface, a second portion formed by injection molding a non-plateable resin and defining a second top surface, the second portion sitting proud of the first portion such that the second top surface of the second portion is offset from the first top surface of the first portion, and a third portion formed by a chrome plating process where a chrome plating is applied to the first top surface of the first portion such that a third top surface of the third portion is substantially flush with the second top surface of the second portion.

In some implementations, the proud arrangement of the second portion defines a ridge with respect to the first portion. In some implementations, the ridge prevents chrome creep or overplating where the chrome plating extends over the second top surface of the second portion. In some implementations, a thickness of the third portion is in a range from approximately 20 to 60 microns. In some implementations, the plateable resin is acrylonitrile butadiene styrene (ABS), polycarbonate-ABS (PC-ABS), or an amide-based polymer. In some implementations, the non-plateable resin is polycarbonate (PC), polyethylene terephthalate (PET), polybutylene terephthalate (PBT), an amide-based polymer, or a combination thereof. In some implementations, one of the first and second portions has a surface texturing.

According to another aspect of the present disclosure, a method of manufacturing a selectively chrome plated object having a substantially flush interface is presented. In one exemplary implementation, the method comprises injection molding a plateable resin to form a first portion of the object, the first portion defining a first top surface, injection molding a non-plateable resin to form a second portion of the object that sits proud with respect to the first portion, the second portion defining a second top surface, and performing a chrome plating process where a chrome plating is applied to the first top surface of the first portion to form a third portion defining a third top surface that is substantially flush with the second top surface of the second portion.

In some implementations, the proud arrangement of the second portion defines a ridge with respect to the first portion. In some implementations, the ridge prevents chrome creep or overplating where the chrome plating extends over the second top surface of the second portion. In some implementations, a thickness of the third portion is in a range from approximately 20 to 60 microns. In some implementations, the plateable resin is ABS, PC-ABS, or an amide-based polymer. In some implementations, the non-plateable resin is PC, PET, PBT, an amide-based polymer, or a combination thereof.

In some implementations, the method further comprises predetermining a thickness of the third portion by modeling based on at least one of (i) a geometry of the object, (ii) at least one of low and high current density areas on a plating rack, (iii) spacing between the object and a sill of the plating rack, and (iv) material conductivity. In some implementations, the method further comprises determining how to control the injection molding to achieve the proud arrangement of the second portion based on the predetermined thickness of the third portion.

In some implementations, the method further comprises using a textured tool during the injection molding of one of the first and second portions to create a surface texturing. In some implementations, the method further comprises post-processing one of the first and second portions to create a surface texturing.

According to another aspect of the present disclosure, another method of manufacturing a selectively chrome plated object having a substantially flush interface is presented. In one exemplary implementation, the method comprises injection molding a non-plateable resin to form a non-plateable portion of the object, the non-plateable portion defining a first top surface and a first thickness, after forming the non-plateable portion, injection molding a plateable resin to form a plateable portion of the object, the plateable portion defining a second top surface and a second thickness, wherein the non-plateable portion sits proud with respect to the plateable portion such that the second top surface of the plateable portion is offset from the first top surface of the non-plateable portion, and after forming the plateable portion, performing a chrome plating process where a chrome plating is applied to the second top surface of the plateable portion to form a chrome plating portion of the object, the chrome plating portion defining a third thickness and a third top surface that is substantially flush with the first top surface of the non-plateable portion.

In some implementations, the first thickness is approximately equal to a sum of the second and third thicknesses. In some implementations, the third top surface of the chrome plating portion is less than 20 percent of the third thickness from being flush with the first top surface of the non-plateable portion.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Selective chrome plating techniques that achieve a substantially flush interface are presented herein. These techniques involve a multi-shot (e.g., two-shot) injection molding process for forming an object having an exposed surface where the non-plateable resin (e.g., polycarbonate, or PC) sits proud of a plateable resin (e.g., acrylonitrile butadiene styrene, or ABS). While PC and ABS are specifically discusses herein as non-plateable and plateable resins, respectively, it will be appreciated that these techniques are applicable to other suitable non-plateable and plateable resins. Some non-limiting examples of plateable resins include ABS, PC-ABS, and amide-based polymers (e.g., nylon/polyamide (PA)), and some non-limiting examples of non-plateable resins include PC, polyethylene terephthalate (PET), and polybutylene terephthalate (PBT), amide-based polymers, and combinations thereof (e.g., PET+PC). Chrome plating is then performed, which causes chrome plating to build up on a portion of the exposed surface of the object corresponding to the plateable resin. The plating process is precisely controlled such that the resulting exposed surface of the object has a substantially flush interface between the plating atop the plateable resin and the non-plateable resin. Some example benefits of these techniques include enhanced visual appearance, a smoother feel when touched, and mitigating excess chrome plating.

Figure 1:
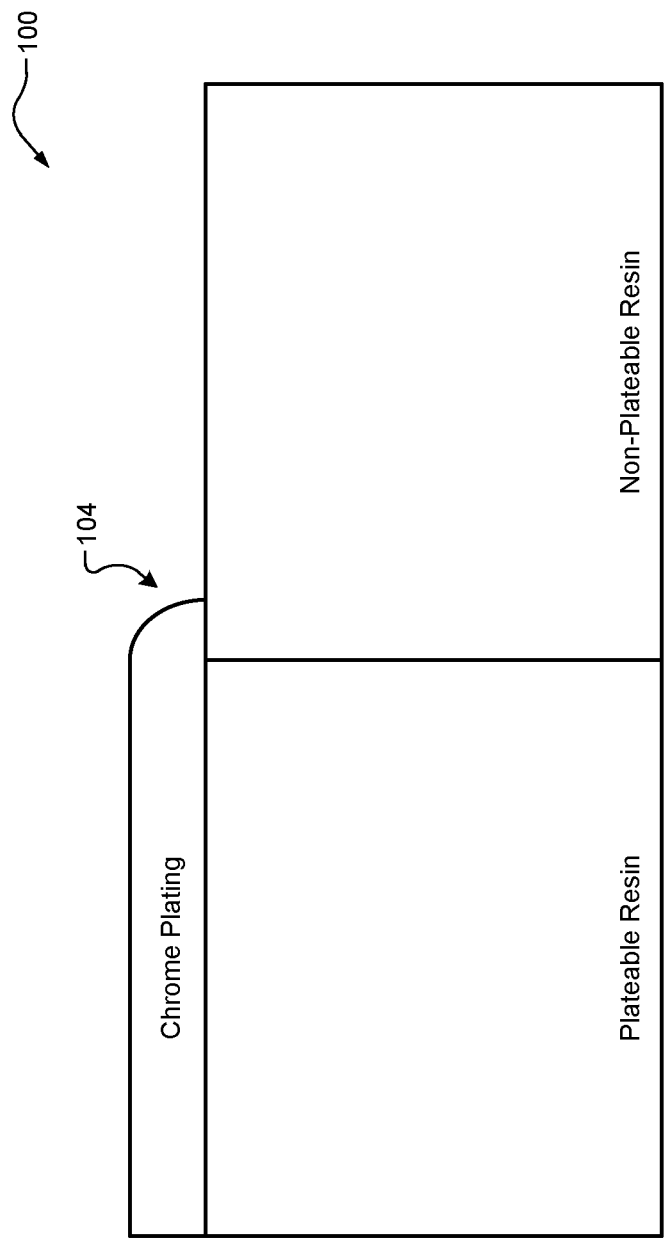
FIG. 1 is a side or cross-sectional view of a selectively chrome plated object according to the prior art.
Figure 2:
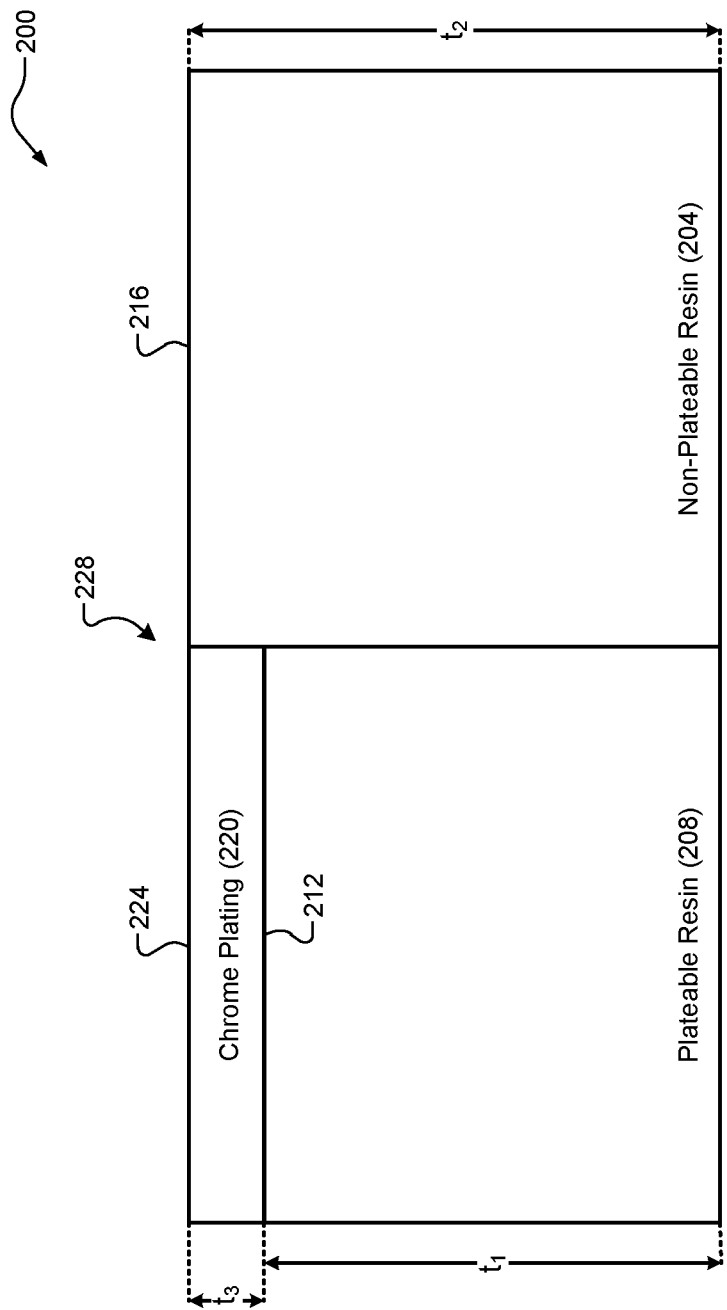
FIG. 2 is a side or cross-sectional view of an example selectively chrome plated object with a flush interface according to the principles of the present disclosure.

Referring now to FIG. 2, a side or cross-sectional view of an object 200 formed according to the techniques of the present disclosure is illustrated. As shown, a non-plateable resin (e.g., PC) portion 204 sits proud of a plateable resin (e.g., ABS) portion 208. As a result, a top surface 212 of the plateable resin portion 208 is below or offset from a top surface 216 of the non-plateable resin portion 204. While the non-plateable resin portion 204 is illustrated to have a thickness ($t_2$) that is greater than a thickness ($t_1$) of the plateable resin portion 208, it will be appreciated that a rear or bottom portion of the object 200 may not have a flush interface between the non-plateable resin portion 204 and the plateable resin portion 208 as illustrated and thus thickness $t_1$ could be greater than thickness $t_2$. A layer of chrome plating 220 having a thickness ($t_3$) is then applied to the top surface 212 of the plateable resin portion 208. This process is precisely controlled such that a top surface 224 of the chrome plating 220 is substantially flush with the top surface 216 of the non-plateable resin portion 204, thereby creating a substantially flush interface 228. In one exemplary implementation, thickness $t_2$ is approximately equal to a sum of thickness $t_1$ and thickness $t_3$. In some implementations, the term "substantially flush" indicates the top surface 224 of the chrome plating portion 220 being within a certain amount (e.g., a percentage of thickness $t_3$) from flush with the top surface 216 of the non-plateable resin portion 204. For example only, this amount could be 20% of the thickness $t_3$. It will be appreciated that other percentages and/or acceptable flushness thresholds could be utilized. It will also be appreciated that for smaller thicknesses $t_3$, such as for interior applications compared to exterior applications, a more flush interface would be desirable.

Figure 3:
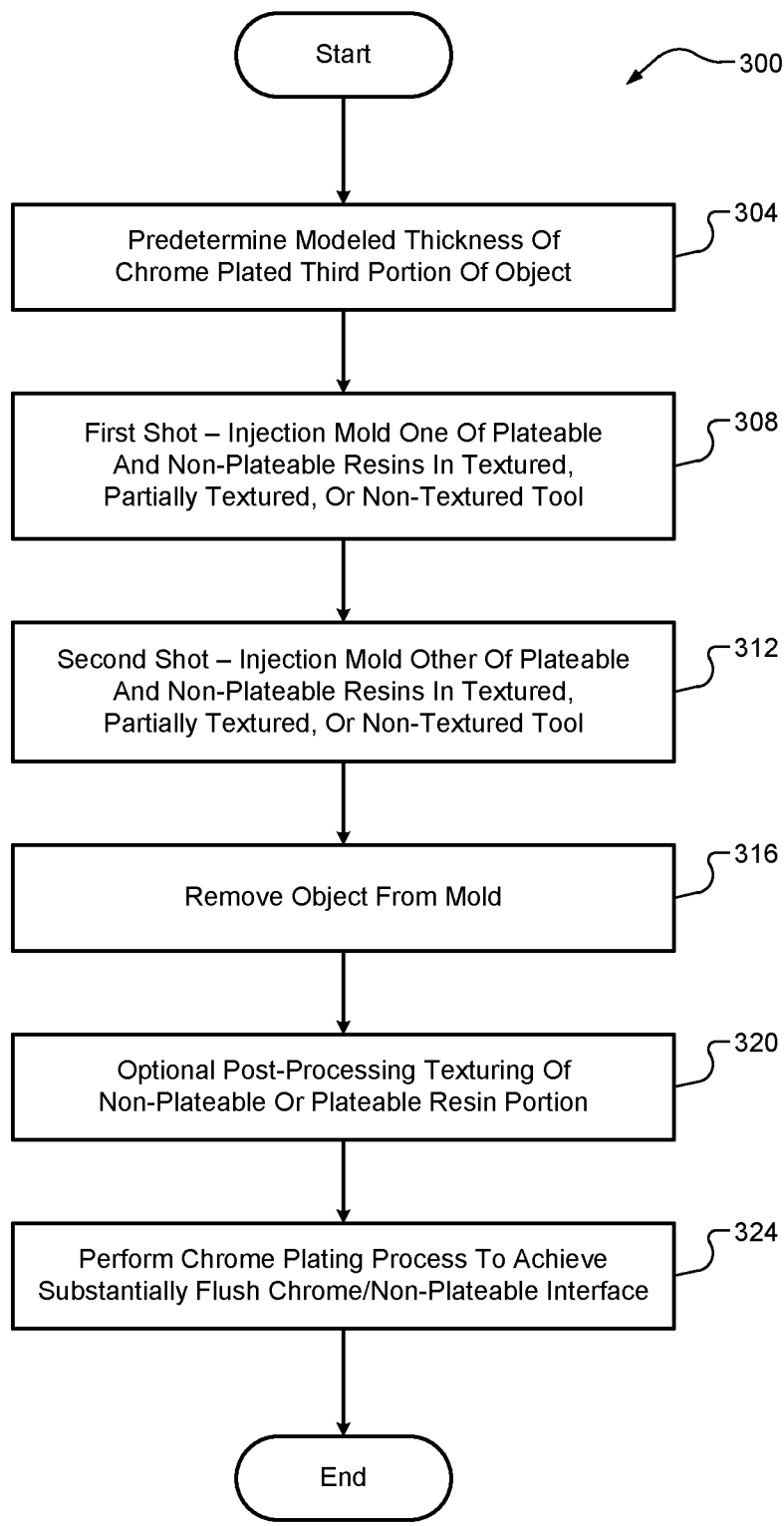
FIG. 3 is a flow diagram of an example method of manufacturing a selectively chrome plated object with a flush interface according to the principles of the present disclosure.

Referring now to FIG. 3 and with continued reference to FIG. 2, a method 300 is presented. At 304, a thickness of the chrome plating layer 220 is predetermined. In one exemplary implementation, this thickness is in a range from approximately 20-60 microns. For interior applications, for example, the thickness range could be approximately 20-40 microns, whereas for exterior applications, for example, the thickness range could be approximately 40-60 microns. For example only, for the 40-60 micron thickness range for exterior applications, the substantially flush interface could be preferably within approximately 20 microns from flush, more preferably within approximately 10 microns from flush, and even more preferably within approximately 5 microns from flush. In one exemplary implementation, this thickness could be predetermined using a model with various parameters as inputs, such as, but not limited to, (i) a geometry of the object 200, (ii) at least one of low and high current density areas on a plating rack during the chrome plating process, (iii) spacing between the object 200 and a sill of the plating rack, and (iv) material conductivity. The low and high current density areas, for example, depend upon the position of the object 200 on the plating rack. For example, the object 200 could be placed closer to an anode in a low current density area to improve uniformity across the entire plating rack. It will be appreciated that any suitable model and parameters could be utilized to predetermined the thickness of the chrome plating layer 220. For example only, Elsyca® PlatingManager software could be utilized to model the chrome plating thickness. Once this thickness is known, injection molding can occur. It will be appreciated that there could be other intermediate steps, such as offsetting or designing molds or other tooling for the injection molding process based on the known thickness of the chrome plating layer. It will also be appreciated that the thickness of the chrome plating layer 220 could vary along the length of the object 200, particularly for longer objects. This could be due to, for example, the positioning of the object 200 on the plating rack and varying distance from the anode. The acceptable flushness parameter may therefore be with respect to an average thickness of the chrome plating layer 220 along the entire length of the object 200.

At 308, a first injection molding shot is performed. This could be either injection molding the non-plateable resin or the plateable resin in a textured, partially textured, or non-textured tool to form one of the non-plateable resin portion 204 and the plateable resin portion 208. It may be preferable, however, to first inject the non-plateable resin to first form the non-plateable resin portion 204. At 312, a second injection molding shot is performed with the other of the non-plateable and plateable resins in a textured, partially textured, or non-textured tool to form the other of the non-plateable resin portion 204 and the plateable resin portion 208. While only two shots of a multi-shot injection molding process are illustrated and discussed above, it will be appreciated that the object 200 could be formed of three or more shots of multi-shot injection molding process. The tool(s) could be previously textured by methods including, but not limited to, laser etching/texturing, sandblasting, electro erosion (e.g., electrical discharge machining, or EDM), machining, and chemical etching. At 316, the object 200 is removed from the mold. At 320, post-processing texturing can be optionally added to the non-plateable resin portion 204 or the plateable resin portion 208 of the object 200 (e.g., for enhanced visual effect). This could include, for example, machining the top surface 216 of the non-plateable resin portion 204 or the top surface 212 of the plateable resin portion 208, applying an additional layer of material thereto, or via another process such as laser etching/texturing, sandblasting, chemical etching, and the like. In-tool texturing, however, is preferred over post-processing for mass production of the component 200 for economic reasons.

At 324, a chrome plating process is performed whereby the chrome plating layer 220 is applied to the top surface 212 of the plateable resin portion 208 such that the top surface 224 of the chrome plating 220 is substantially flush with the top surface 216 of the non-plateable resin portion 204, thereby creating a substantially flush interface 228. The method 300 then ends or could return to 308 for the manufacturing of another object 200.

It will be appreciated that the object 200 could be any suitable plastic object having decorative chrome plating applied thereto. One non-limiting example of the object 200 is a decorative trim for a vehicle. For vehicle trim applications, the object 200 could be an interior component (a dash assembly, a center console assembly, a multimedia or infotainment unit assembly, a door trim panel, etc.) or an exterior body component (front or side grille assemblies, bumper or fender accents, head or taillight accents, a trunk lid finisher, etc.). It will be appreciated that the systems and methods described herein are not limited to automotive applications and could be applicable to decorative trims for non-automotive applications (appliances and consumer goods, railway, motorbikes, aerospace, etc.). As previously discussed, these decorative trims could be backlighted decorative trims, where a substantially flush interface with no chrome creep is ideal for the best backlighting effect.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A selectively chrome plated object having a flush interface, the object comprising:
    a first portion defining a first top surface, the first portion being an injection molded plateable resin;
    a second portion defining a second top surface and a rear surface opposite the second top surface, the second portion being an injection molded non-plateable resin and sitting proud of the first portion such that the second top surface of the second portion is offset a first distance from the first top surface of the first portion; and
    a chrome plating layer applied to the first top surface of the first portion in an amount defining a thickness of the chrome plating layer that is equal to the first distance, such that a top surface of the chrome plating layer is flush with the second top surface of the second portion and such that a bottom surface of the chrome plating layer is in direct contact with the first top surface of the first portion,
    wherein:
        the rear surface of the second portion is an external surface of the selectively chrome plated object; and
        a distance between the second top surface and the rear surface of the second portion equals a total thickness of the selectively chrome plated object.

2. The object of claim 1, wherein the proud arrangement of the second portion defines a ridge with respect to the first portion.

3. The object of claim 2, wherein the ridge prevents chrome creep or overplating where the chrome plating extends over the second top surface of the second portion.

4. The object of claim 1, wherein the thickness of the chrome plating layer is in a range from approximately 20 to 60 microns.

5. The object of claim 1, wherein the plateable resin is acrylonitrile butadiene styrene (ABS), polycarbonate-ABS (PC-ABS), or an amide-based polymer.

6. The object of claim 1, wherein the non-plateable resin is polycarbonate (PC), polyethylene terephthalate (PET), polybutylene terephthalate (PBT), an amide-based polymer, or a combination thereof.

7. The object of claim 1, wherein one of the first and second portions has a surface texturing.

8. The object of claim 1, wherein no portion of the first portion extends intermediate the second top surface and the rear surface of the second portion.

9. The object of claim 1, wherein the rear surface of the second portion is exposed to a lighting source for illumination of the second top surface.

10. The object of claim 1, wherein the rear surface of the second portion is flush with a rear surface of the first portion.

11. A method of manufacturing a selectively chrome plated object having a flush interface, the method comprising:
- injection molding a plateable resin to form a first portion of the object, the first portion defining a first top surface;
- injection molding a non-plateable resin to form a second portion of the object that sits proud with respect to the first portion, the second portion defining a second top surface and a rear surface opposite the second top surface, wherein the second top surface is offset a first distance from the first top surface, wherein the rear surface of the second portion is an external surface of the selectively chrome plated object, and wherein a distance between the second top surface and the rear surface of the second portion equals a total thickness of the selectively chrome plated object; and
- performing a chrome plating process where a chrome plating is applied to the first top surface of the first portion in an amount defining a thickness of the chrome plating layer that is equal to the first distance to form a third portion consisting of the chrome plating and defining a third top surface that is flush with the second top surface of the second portion and a bottom surface of the third portion that is in direct contact with the first top surface of the first portion.

12. The method of claim 11, wherein the proud arrangement of the second portion defines a ridge with respect to the first portion.

13. The method of claim 12, wherein the ridge prevents chrome creep or overplating where the chrome plating extends over the second top surface of the second portion.

14. The method of claim 12, wherein the thickness of the third portion is in a range from approximately 20 to 60 microns.

15. The method of claim 12, wherein the plateable resin is acrylonitrile butadiene styrene (ABS), polycarbonate-ABS (PC-ABS), or an amide-based polymer.

16. The method of claim 12, wherein the non-plateable resin is polycarbonate (PC), polyethylene terephthalate (PET), polybutylene terephthalate (PBT), an amide-based polymer, or a combination thereof.

17. The method of claim 12, further comprising predetermining the thickness of the third portion by modeling based on at least one of (i) a geometry of the object, (ii) at least one of low and high current density areas on a plating rack, (iii) spacing between the object and a sill of the plating rack, and (iv) material conductivity.

18. The method of claim 17, further comprising determining how to control the injection molding to achieve the proud arrangement of the second portion based on the predetermined thickness of the third portion.

19. The method of claim 12, further comprising using a textured tool during the injection molding of one of the first and second portions to create a surface texturing.

20. The method of claim 12, further comprising post-processing one of the first and second portions to create a surface texturing.

* * * * *